United States Patent
Nellitheertha

(10) Patent No.: US 7,197,577 B2
(45) Date of Patent: Mar. 27, 2007

(54) AUTONOMIC INPUT/OUTPUT SCHEDULER SELECTOR

(75) Inventor: Hariprasad Nellitheertha, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 321 days.

(21) Appl. No.: 10/735,428

(22) Filed: Dec. 12, 2003

(65) Prior Publication Data

US 2005/0144332 A1    Jun. 30, 2005

(51) Int. Cl.
  *G06F 3/00* (2006.01)
  *G06F 13/00* (2006.01)
  *G06F 15/00* (2006.01)

(52) U.S. Cl. ............. 710/6; 710/1; 710/15; 710/100; 710/107; 710/111; 712/1; 712/32; 712/42; 712/43

(58) Field of Classification Search ............. 710/6
See application file for complete search history.

(56) References Cited

U.S. PATENT DOCUMENTS 5,394,547 A * 2/1995 Correnti et al. ............. 717/175
6,904,470 B1 * 6/2005 Ofer et al. ..................... 710/6

OTHER PUBLICATIONS

Andrew S. Tanenbaum; Structured Computer Organization; 1984; Prentice-Hall, Inc.; Second Edition; p. 11.*
IEEE Authoritative Dictionary of IEEE Standards Terms; Dec. 2000; Institute of Electronic Engineers; Seventh Edition; p. 599.*
Iyer,S. and Druschel, P., "Anticipatory Scheduling: A disk scheduling framework to overcome deceptive idleness in synchronous I/O", *Proceedings of 18th ACM Symposium on Operating Systems Principles*, Oct. 2001.

* cited by examiner

*Primary Examiner*—Fritz Fleming
*Assistant Examiner*—Richard B. Franklin
(74) *Attorney, Agent, or Firm*—T. Rao Coca; Anthony V.S. England

(57) ABSTRACT

The automatic selection of an input/output scheduler in a computing system with a plurality of input/output schedulers is disclosed. Each of the plurality of input/output schedulers is mapped against a corresponding desired set of heuristics. Heuristics relating to job requests submitted by processes in the computer system are monitored and analysed. These heuristics may include the number of read and write requests, the ratio of read requests to write requests, input/output throughput, disk utilization and the average time taken for processes to submit subsequent jobs once an initial job completes. The analysed heuristics are compared to the desired sets of heuristics for the plurality of input/output schedulers to select one of the plurality of input/output schedulers.

9 Claims, 8 Drawing Sheets

AUTONOMIC INPUT/OUTPUT SCHEDULER SELECTOR

FIELD OF THE INVENTION

The present invention relates to the transfer of data in computing systems and, in particular, to the selection of an input/output scheduler in a computing system.

BACKGROUND

A computer system typically comprises a central processing unit coupled to a number of other modules, including memory, storage devices, a mouse, a keyboard, printers, and scanners. Some or all of these modules may reside within a single computer case. Alternatively, some modules may be external to a case holding the central processing unit. Input/Output (I/O) refers to the transfer of data to and from one or more of these modules.

Input/Output (I/O) schedulers are a component of a computer operating system and typically reside between a core kernel layer/file system layer and various hardware drivers for supporting hardware coupled to the computer. Such hardware typically includes hard disk drives, floppy disk drives, optical disk drives, printers, and scanners. I/O schedulers receive job requests from upper layers of the operating system and determine the order, number, and fashion in which those jobs are submitted to underlying hardware drivers. A job is an operation to be performed by the I/O scheduler as a result of a request submitted by a process. A process is an application program in execution. In the context of I/O and I/O schedulers, a process is a uniquely identifiable entity submitting I/O jobs to the hardware. The hardware drivers perform the actual I/O tasks.

FIG. 1 is a schematic block diagram representation 100 of the relationship between an I/O scheduler and other computer system components. Applications 110 occupy a highest layer and provide job requests to an operating system kernel and file system 120. The operating system kernel and file system 120 submits job requests to an I/O scheduler 130, which in turn distributes the job requests among disk drivers 140. Information relating to the processing of a job is returned from the disk drivers 140 to the applications 110, via the I/O scheduler 130 and the operating system kernel and file system 120. Such information may include how much data has been written to a disk drive or read from a disk drive.

I/O schedulers determine and monitor the nature of the workload being undertaken by a computer system by collecting heuristics on job requests submitted. A read is an I/O job requested by an executing application through the operating system kernel to a particular piece of storage hardware. The read job requests particular data to be read from the hardware. A write is an I/O job requested by an executing application through the operating system kernel to a particular piece of storage hardware. The write job requests particular data to be written to the storage hardware.

Typical heuristics monitored include the number of reads and writes submitted, the proportion of reads to writes, the average time taken for processes to submit subsequent jobs once an initial job completes, I/O throughput, and disk utilization. The I/O schedulers utilise the collated heuristics for fine-tuning the scheduling process.

FIG. 2 is a schematic block diagram representation 200 of the collection of heuristics in the computer system of FIG. 1. An operating system module 210 submits job requests to an I/O scheduler module 220. The I/O scheduler module 220 distributes the job requests among hardware drivers 230. The hardware drivers 230 perform the jobs and return information relating to those jobs to the I/O scheduler module 220. The I/O scheduler module 220 collects heuristics pertaining to the job requests received from the operating system module 210 and passes the heuristics recursively to be used by the I/O scheduler module 220 for fine-tuning of operating and performance parameters.

One goal of an I/O scheduler is to increase throughput and disk utilization. Another goal of an I/O scheduler is to provide a degree of fairness among various competing processes that submit jobs. There are a number of known scheduling algorithms that seek to achieve these goals. Such scheduling algorithms include First In First Out (FIFO) (also known as First Come First Served (FCFS)), Shortest Positioning Time First (SPTF), Anticipatory Scheduler (AS), Deadline scheduler, and the Fairness Queue scheduler.

The FIFO scheduler handles job requests on a first-in first-out basis. Thus, the first job received by the FIFO scheduler is the first job to be passed to a device driver.

The anticipatory scheduler attempts to anticipate successive job requests from a process. When a job has been performed by a device driver and the completed job has been returned to the requesting process, the anticipatory scheduler waits for a predetermined time in anticipation of another request from the same process. This property of the anticipatory scheduler is advantageous when a process is performing a synchronous read from a disk with a large proportion of the data being read having spatial locality in the disk. Anticipating a further job in the same location avoids overhead that otherwise is incurred in disk seek times. A description of this algorithm is provided in Iyer, S. and Druschel, P.—"Anticipatory scheduling: A disk scheduling framework to overcome deceptive idleness in synchronous I/O", 18$^{th}$ *Association for Computing Machinery Symposium on Operating Systems Principles* (*SOSP* 2001). The anticipatory scheduling algorithm has recently been implemented for the Linux 2.6 kernel.

The Fairness Queue algorithm services each process having I/O job requests in a round-robin fashion to ensure that each process is treated fairly. The Fairness Queue algorithm is suited to situations in which many processes submit I/O jobs, without any pattern to the job requests.

The deadline scheduler attempts to pick the closest job, in disk spatial locality terms, to the current job. However, the deadline scheduler also maintains a certain priority for each job request process. The deadline scheduler reduces disk seek time, whilst ensuring that there is an upper limit to the latency that any job request can experience.

Due to the nature, variable frequency and competing demands of I/O jobs, it is difficult, if not impossible, for an I/O scheduler using any given scheduling algorithm to obtain the desired goals of maximum throughput and disk utilisation whilst maintaining fairness among competing processes. For example, if a first process is performing numerous and extended, or heavy, reads from a secondary storage device and an associated I/O scheduler is implementing a Fairness Queue algorithm, reads to the secondary storage device appear to be stalled as the scheduler treats the read process as just another process and allocates jobs in a round-robin fashion. An anticipatory scheduler, which waits for a process to submit job requests in the same spatial locality, provides better performance in such a scenario.

In a different example, in which numerous processes submit I/O job requests, such as in a web server, the anticipatory scheduler may appear to be biased towards a particular process. In such a scenario, the anticipatory scheduler waits for a further job request from a first process that submitted an initial job request, even if the first process has no further job request to submit. Consequently, other processes wait unnecessarily. Accordingly, the anticipatory scheduler might not be the optimal scheduler for the given circumstances. In such a scenario, a deadline or Fairness Queue algorithm may be a better choice.

Attempts to address every situation within a single scheduler usually result in a compromised implementation of any algorithm. The system fails to deliver the potential throughput capabilities of the system hardware. Utilising the wrong algorithms for given workloads typically results in large latencies, irrespective of the speed of the processor, amount of memory on board, or other system parameters. Accordingly, if a system is implemented with a single type of scheduler, then that system should be dedicated to a certain kind of workload to provide acceptable performance.

Some operating systems provide multiple I/O schedulers. Applications select an I/O scheduler, based on the nature of the workload. Thus, application designers must be able to predict the nature of I/O workload that the applications are likely to generate. As the nature of the workload is typically dynamic and quite variable, an I/O scheduler selected by an application may, in fact, result in degraded performance if circumstances are different from those predicted by the application designer. Whilst a predicted scheduler is suited to an application in isolation, the same scheduler can be detrimental to that application in a particular computing system having many other competing processes producing similar or different workloads. The overall workload seen by the I/O scheduler is the net result of all the workloads generated by the competing processes. Consequently, the result produced by the predicted scheduler may not be optimal for that application in a given computer system.

Another approach provides a system administrator with an interface for selecting an I/O scheduler. The interface may be implemented using one or more configurable system parameters. Whilst such an implementation provides a system administrator with the flexibility to change schedulers dynamically, the system administrator must monitor the nature of workloads being undertaken by the system. Further, in the scenario in which each I/O scheduler is implemented on a per-disk basis, as is common, the system administrator must attempt to monitor the nature of the workload on each disk in the system at all times to optimise the scheduling of tasks.

In each of the approaches described above, there is significant dependency on external interaction to select an appropriate I/O scheduler. Thus, a need exists to provide a method of selecting an I/O scheduler that is not dependent on applications or system administrators.

SUMMARY

The automatic selection of an input/output scheduler in a computing system with a plurality of input/output schedulers is disclosed. Each of the plurality of input/output schedulers is mapped against a corresponding desired set of heuristics. Heuristics relating to job requests submitted by processes in the computer system are monitored and analysed. The analysed heuristics are compared to the desired sets of heuristics for the plurality of input/output schedulers to select one of the plurality of input/output schedulers.

According to a first aspect of the present invention, there is provided a method for selecting an input/output scheduler in a computing system having a plurality of input/output schedulers. Each of the plurality of input/output schedulers is mapped against a corresponding desired set of heuristics and heuristics relating to job requests performed in the computing system are monitored. The method then determines whether the monitored heuristics match any of the desired sets of heuristics to select one of the plurality of input/output schedulers.

According to a second aspect of the invention, there is provided a method for automatically selecting an input/output scheduler in a computing system having a plurality of input/output schedulers. The method comprises the steps of monitoring heuristics of job requests performed in the computing system and comparing the monitored heuristics with a desired set of heuristics to select one of the plurality of input/output schedulers.

According to a third aspect of the invention, there is provided an apparatus for selecting an input/output scheduler in a computing system having a plurality of input/output schedulers. The apparatus comprises a device for monitoring heuristics of jobs performed in the computing system, and a device for comparing the monitored heuristics with a desired set of heuristics associated with each of the plurality of input/output schedulers to determine a preferred one of the input/output schedulers. The apparatus also comprises a device for activating the preferred input/output scheduler.

According to a fourth aspect of the invention, there is provided a computing system for selecting an input/output scheduler. The computing system comprises at least one application and a plurality of input/output schedulers. Each of the plurality of input/output schedulers is mapped against a corresponding desired set of operating heuristics. The computing system further comprises an operating system kernel for gathering and analysing heuristics relating to job requests submitted to the operating system kernel by the at least one application. The operating system kernel selects one of the plurality of input/output schedulers, based on the analysed heuristics and the desired sets of operating heuristics in the table.

According to a fifth aspect of the invention, there is provided an operating system kernel in a computing system. The operating system kernel comprises a device for maintaining a predetermined set of values associated with a plurality of input/output schedulers, and a device for monitoring heuristics associated with jobs performed in the computing system. The operating system kernel further comprises a device for comparing the monitored heuristics with the predetermined set of values to select one of the plurality of input/output schedulers.

According to a sixth aspect of the invention, there is provided a computing system having a plurality of available input/output schedulers. The computing system comprises an operating system module, and an input/output scheduling module having an active input/output scheduler selected from the plurality of input/output schedulers. The computing system also comprises a hardware device drivers module for executing job requests received from the operating system module via the input/output scheduling module; and a heuristics module for analysing information returned from the hardware device drivers module relating to the executed job requests. A switch module compares the analysed information with a predetermined set of values to select a preferred one of the plurality of input/output schedulers and a kernel thread switches the active input/output scheduler in the input/output scheduling module to the preferred input/output scheduler.

According to another aspect of the present invention, there is provided a computer program product comprising a computer readable medium having recorded thereon a computer program for implementing any one of the methods described above.

Other aspects of the invention are also disclosed.

DETAILED DESCRIPTION

Figure 1:
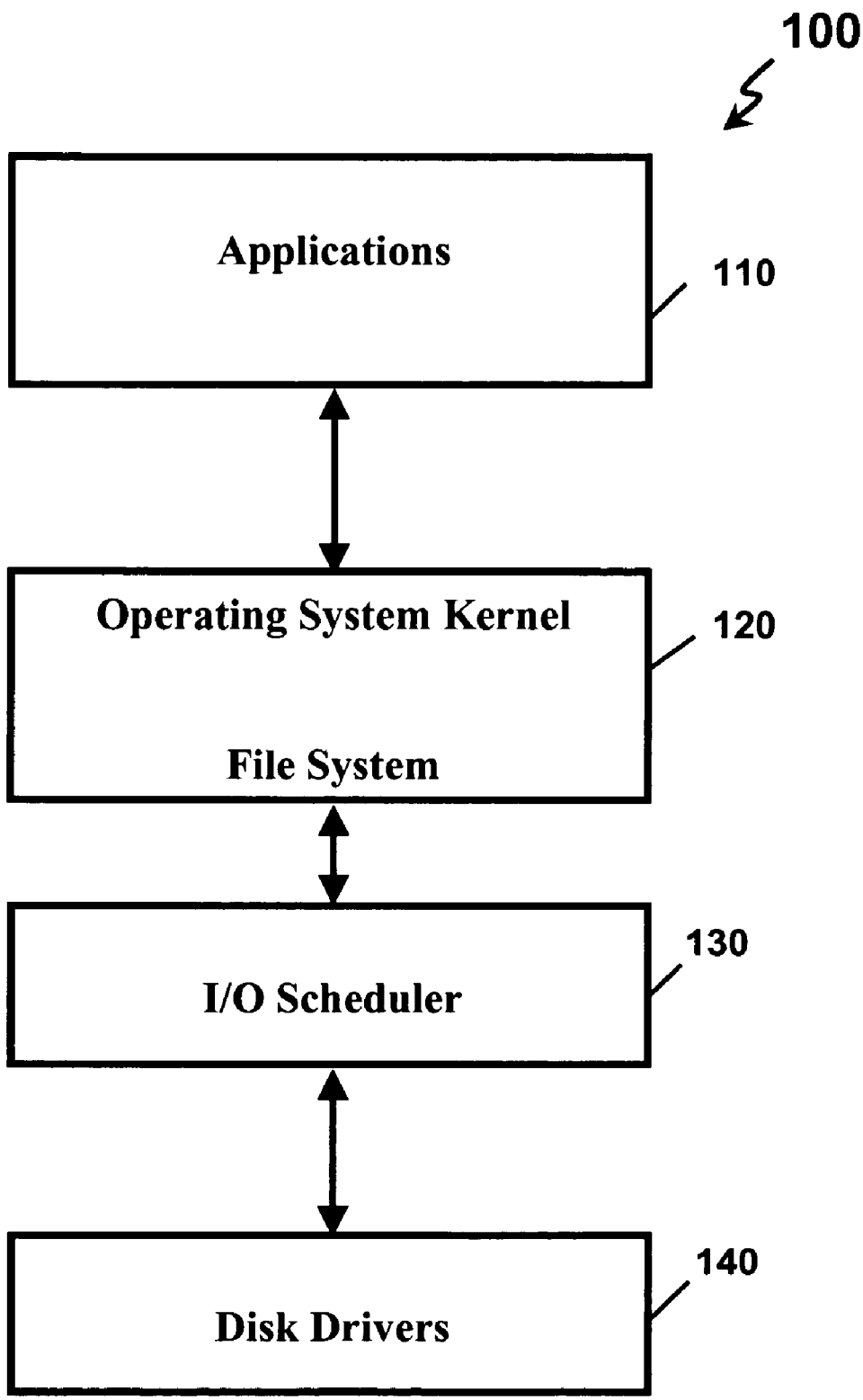
FIG. 1 is a schematic block diagram representation of the relationship between an I/O scheduler and other computer system components.
Figure 2:
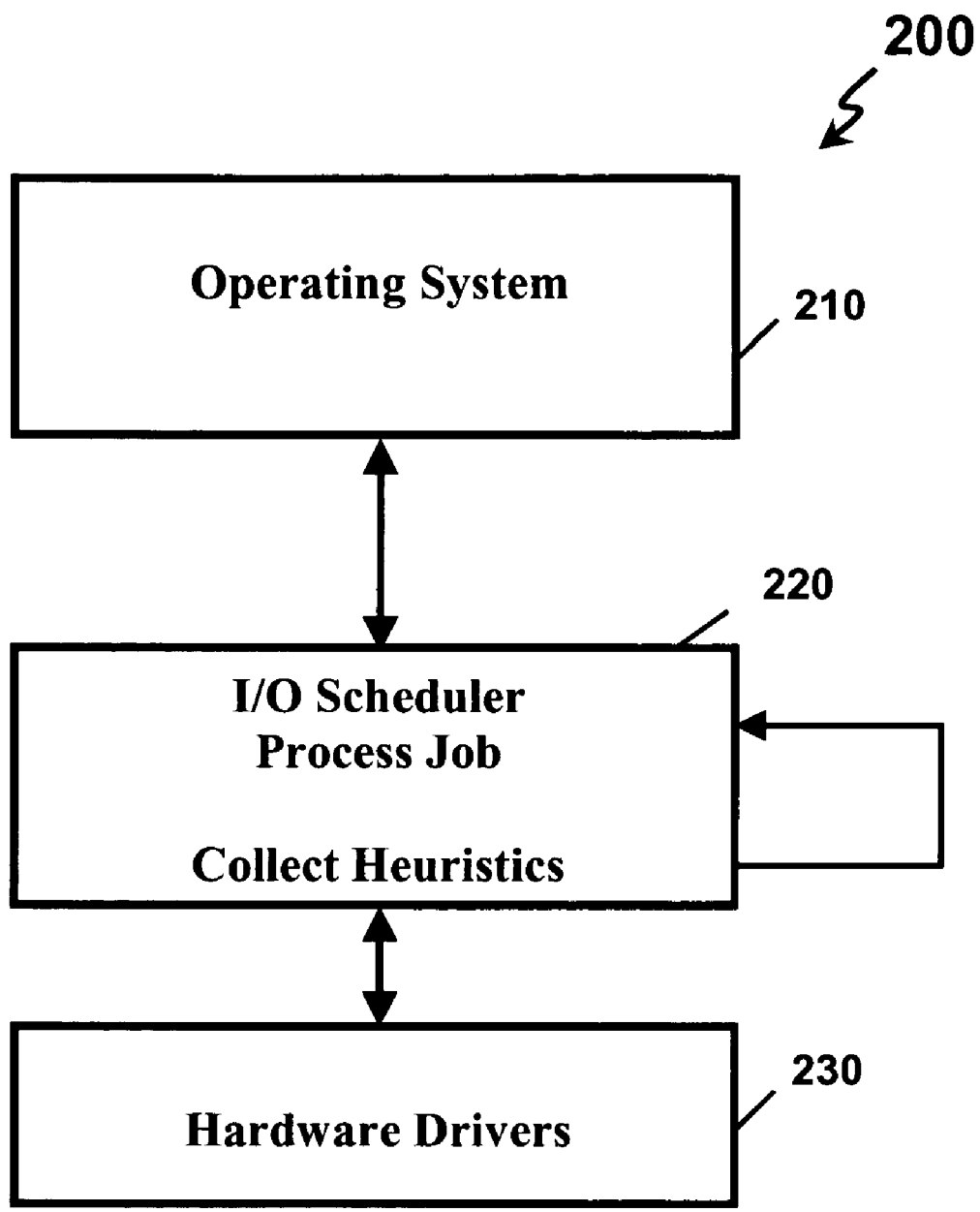
FIG. 2 is a schematic block diagram representation of the collection and monitoring of heuristics by an I/O scheduler.

Methods and systems for selecting an I/O scheduler are disclosed hereinafter. In the following description, numerous specific details, including scheduling algorithms and heuristic values, are set forth. However, from this disclosure, it will be apparent to those skilled in the art that modifications and/or substitutions may be made without departing from the spirit and scope of the invention. In other circumstances, specific details may be omitted so as not to obscure the invention.

Where reference is made in any one or more of the accompanying drawings to steps and/or features that have the same reference numerals, those steps and/or features have for the purposes of this description the same function(s) or operation(s), unless the contrary intention appears.

Disclosed are arrangements that provide a method and system for selecting an I/O scheduler at an operating system level to utilise an appropriate I/O scheduler for I/O jobs being handled at any given point in time. The method and system disclosed are adaptive to a system workload and dynamically switch I/O schedulers.

In accordance with an embodiment of the present invention, gathering of heuristics and interpretation thereof are performed for every job submitted at the operating system kernel level on a per queue basis, rather than being performed by the I/O scheduler. The operating system accesses the heuristics independently of the scheduler. The heuristics monitored and analysed include all parameters required to evaluate all of the I/O schedulers operating in a computing system.

An operating system kernel maintains a table mapping each available I/O scheduler against a desired set of heuristics under which that I/O scheduler provides optimal performance in respect of throughput, disk utilization, and fairness to competing processes that submit the job requests. For example, the anticipatory scheduler performs better if the job requests include many streaming reads. Thus, a desired set of heuristics for the anticipatory scheduler is a predetermined ratio of reads to writes and a second predetermined threshold of average number of processes per job. The deadline scheduler performs better when there are a large number of processes submitting job requests. A desired set of heuristics for the deadline scheduler includes a predetermined threshold of average number of processes per job.

In accordance with an embodiment of the present invention, a kernel thread or daemon is provided to gather and interpret required heuristics pertaining to job requests submitted by processes. The kernel thread/daemon interprets the heuristics to determine whether a selected I/O scheduler is suitable for a particular queue of job requests or whether the I/O scheduler should be changed to provide better performance. When the kernel thread/daemon determines that a switch of I/O schedulers is preferable, the kernel thread/daemon dynamically switches the I/O schedulers.

Figure 3:
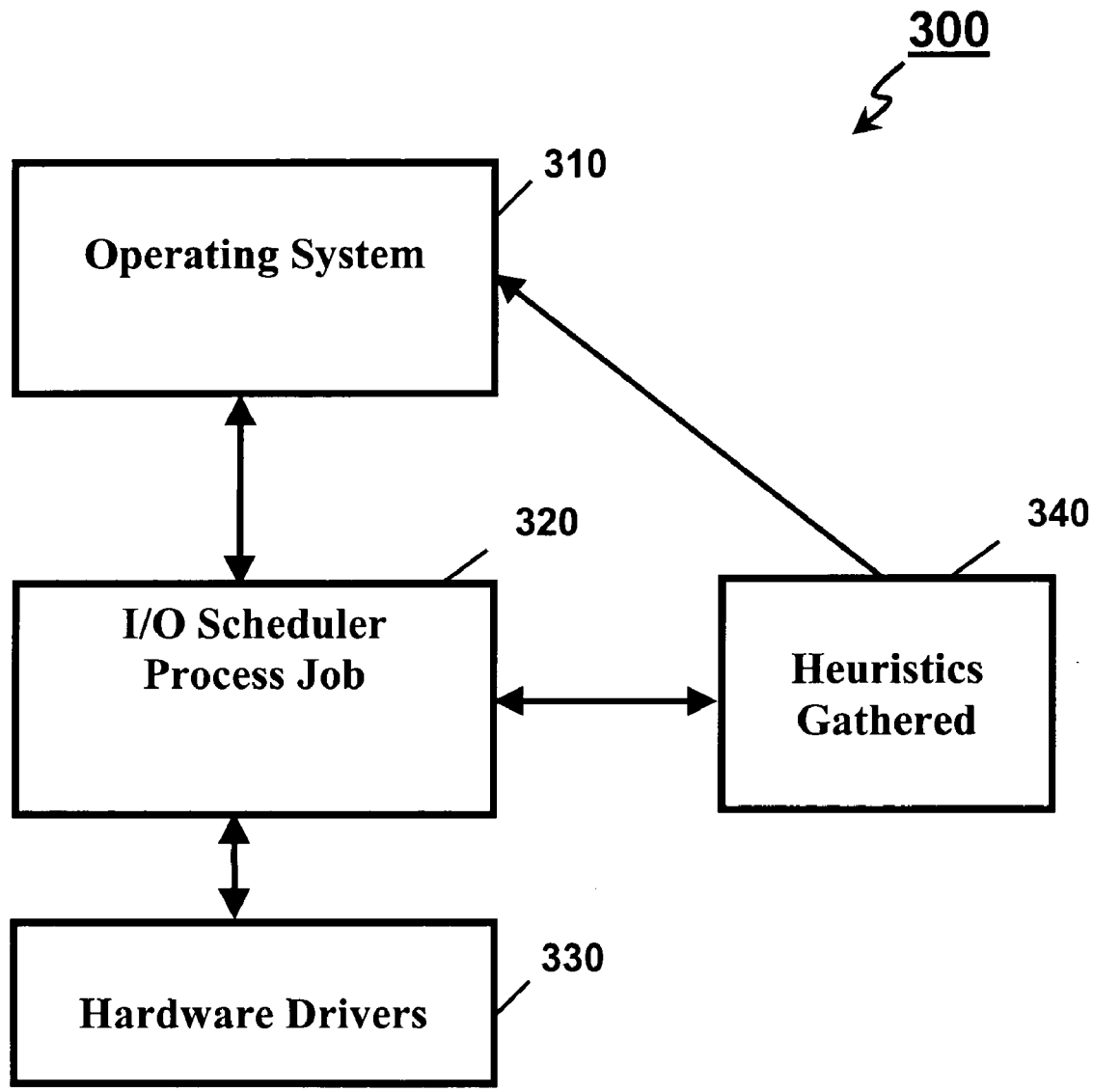
FIG. 3 is a schematic block diagram representation of monitoring and maintenance of heuristics in accordance with an embodiment of the present invention.

FIG. 3 is a schematic block diagram representation 300 of the collection of heuristics in accordance with an embodiment of the present invention. An operating system module 310 submits job requests to an I/O scheduler module 320. The I/O scheduler module 320 presents the job requests to hardware drivers 330. The hardware drivers 330 process the requested jobs and return information about the processing of the jobs to the I/O scheduler module 320. The I/O scheduler module 320 then exchanges heuristic information pertaining to the job requests with a heuristics module 340. The heuristics module 340 gathers and analyses the heuristics and provides a determination to the operating system module 310 as to whether a presently selected I/O scheduler is appropriate for the queue of job requests.

Providing a heuristics module in this manner removes the need for either applications submitting job requests or system administrators to be aware of a workload pattern being experienced by a system to determine an appropriate scheduler. This method and system for selecting an I/O scheduler provides a computing system with the capability to reconfigure scheduling operations based on workload patterns to operate the best available scheduler at any time. Dynamically selecting I/O schedulers allows a system to handle any type of workload and still deliver high throughput and disk utilization. Any system is thus capable of adapting to any type of workload.

Figure 4:
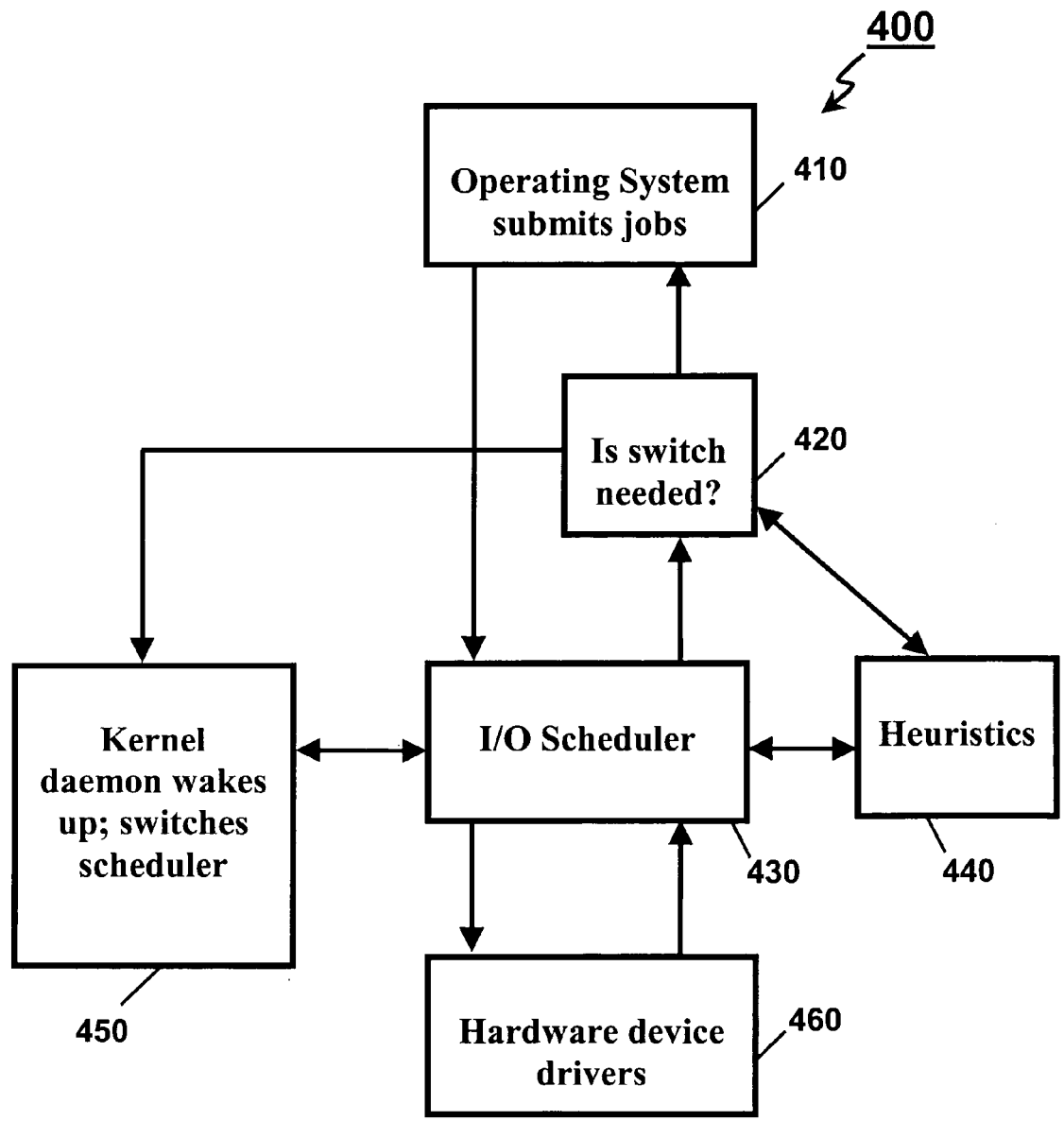
FIG. 4 is a schematic block diagram representation of an autonomic scheduler selector in accordance with an embodiment of the present invention.

FIG. 4 is a schematic block diagram representation of the flow of scheduling information in a computing system 400. In this embodiment, the heuristics module 340 described above in respect of FIG. 3 is embodied in the form of the following constituent components: a heuristics gathering module 440, a switch module 420 and a kernel switching daemon 450. An operating system 410 submits job requests to an I/O scheduler module 430. The I/O scheduler module 430 is connected to the kernel switching thread/daemon 450 that handles the various I/O schedulers available in the computing system. The I/O scheduler module 430 sends jobs to a hardware device drivers module 460. The hardware device drivers module 460 performs the jobs and returns information to the I/O scheduler module 430 about the completed jobs. When the hardware device drivers module 460 performs reads, the information returned to the I/O scheduler module 430 includes data in a read buffer. When the hardware device drivers module 460 performs writes, the information returned to the I/O scheduler module 430 includes details relating to how much data was written.

The I/O scheduler module 430 is further connected to the heuristics gathering module 440. The I/O scheduler module 430 passes information received from the hardware device drivers module 460 to the heuristics gathering module 440. The heuristics gathering module 440 gathers and analyses the information received from the I/O scheduler module 430 to prepare heuristics for the jobs recently completed. A switch module 420 is connected to each of the I/O scheduler module 430 and the operating system 410. The I/O scheduler module 430 sends relevant information received from the hardware device drivers module 460 to the operating system 410 via the switch module 420. The switch module 420 is also connected to the heuristics gathering module 440 and accesses the heuristics prepared by the heuristics gathering module 440. The switch module 420 maintains a set of desired heuristics for each I/O scheduler available in the computing system 400. The switch module 440 compares the heuristics prepared by the heuristics gathering module 440 for the recently completed jobs against the desired sets of heuristics for the available I/O schedulers and determines whether a currently selected I/O scheduler is appropriate for the jobs currently being performed.

If the switch module 420 determines that an I/O scheduler different from the currently selected I/O scheduler is better suited to the heuristics of the jobs currently being performed by the computing system 400, the switch module sends a message to the kernel switching thread/daemon 450 that identifies the more appropriate I/O scheduler. The kernel switching thread/daemon 450 switches the active I/O scheduler in the I/O scheduler module 430 to the more appropriate scheduler.

In an alternate embodiment, the desired set of heuristics for the available I/O schedulers is maintained in the heuristics gathering module 440. The actual location of the desired set of heuristics is not important, provided that the switch module 420 can access those heuristics when determining whether the currently selected I/O scheduler is appropriate.

Implementations of I/O schedulers typically incorporate features from each of the available scheduling algorithms to provide an acceptable level of performance under any type of load. For example, an anticipatory scheduler is implemented with every process submitting jobs also being assigned a priority. If a priority crosses a predetermined threshold value, anticipation stops and jobs are handled based on priority alone.

In another example, a FIFO scheduler is implemented with priority assigned to processes. Jobs crossing a certain threshold get scheduled out of turn to ensure a maximum limit to the starvation a process undergoes. Such an implementation may be incorporated into an embodiment of the present invention to be used as a default scheduler to deliver a minimum level of performance.

In the following example, a computer system is implemented with four I/O schedulers: a FIFO scheduler; an anticipatory scheduler; a Fairness Queue algorithm scheduler; and a default, modified FIFO scheduler, as described above. The workloads to be managed include a program compilation, a streaming read operation, and a file transfer operation.

The program compilation is the compilation of the Linux kernel. The build job is to be performed in a number of parallel processes, with many threads created to compile contemporaneously independent portions of the kernel. The compilation process includes reads and writes and accordingly is very disk I/O intensive. The Fairness Queue algorithm scheduler is suited to this workload, as the Fairness Queue algorithm ensures that each of the parallel processes receives an equal share of the disk I/O device drivers.

The second workload in this example is the streaming read operation relating to large portions being read from a database. The scheduler most suited to this workload is the anticipatory scheduler. Even if there are multiple threads reading from the database, each individual read is largely synchronous. Waiting the predetermined time for a spatially co-located I/O job request greatly increases disk throughput for such a workload. Implementations of the anticipatory scheduler are frequently modified to include a priority mechanism to ensure that there is an upper limit to the latency that any job request experiences before being handled by the I/O scheduler.

The third workload in this example is a file transfer operation relating to a large file download. The most appropriate scheduler is the FIFO scheduler, as there is no real benefit to waiting for I/O job requests without scheduling available job requests. Accordingly, each job request submitted to the scheduler is handled on a first-come, first-served basis.

Hard disks have a reading device called a "head" that moves over a physical storage medium (say magnetic material) to read or write data. The physical distance that the head moves to get to the location of a next I/O job from the current one is called the seek distance.

A workqueue contains a set of I/O job requests. The set of I/O job requests may be grouped, for example, on the basis of media or set of applications. For example, if a computing system includes four different hard disks, I/O job requests associated with each disk could form a workqueue, providing four workqueues for that computing system. Other groupings of I/O job requests are also possible. Another implementation could be based on a set of applications. Even if workgroups are created on the basis of the storage media, it is better to group applications that have similar I/O characteristics together and assign job requests from those applications to a single workqueue. Each workqueue, therefore, has a set of applications. Each of these applications could have several processes running and submitting I/O jobs to an I/O scheduler. I/O scheduler switching decisions are performed at a workqueue level. Thus, different workqueues in a computing system can run different scheduler algorithms at the same point in time.

An embodiment in accordance with the present invention provides an operating system kernel that maintains a predetermined set of variables to determine which scheduler to invoke for a given situation. A first variable, H1, is the number of reads and the number of writes per process. This variable represents the ratio of the total number of I/O job requests to the total number of processes submitting job requests. The number of reads is R, the number of writes is W and the number of processes submitting I/O job requests is P. The variable H1 is defined as follows:

$$H1=(R+W)/P, \tag{1}$$

A second variable maintained by the operating system kernel is the ratio H2 of the total number of reads to the sum of the reads and writes. This variable provides an indication of the nature of I/O job requests being handled by the computing system at a given moment. The variable H2 is defined as follows:

$$H2 = R/(R+W), \quad (2)$$

A third variable is the processing time H3 relating to the time taken by a process to submit a subsequent job to the scheduler upon successful completion of a previous job. In a typical implementation, an I/O scheduler sends a notification signal to a process upon completion of a submitted job to indicate successful completion of the job. On receipt of such a notification signal, the process begins work on submitting a subsequent job request. The variable H3 is defined as follows:

$$H3 = \int_{i=1}^{N} \pounds Gti/N, \quad (3)$$

where $\epsilon ti$ is the time interval between completion of an I/O job request and the start of a successive I/O job request by process i, and N is the total number of job requests submitted to the I/O scheduler.

The average seek distance, H4, is the sum S of the seek distances of the total number of job requests submitted to the scheduler, divided by the total number of job requests N. The variable H4 is defined as follows:

$$H4 = S/N, \quad (4)$$

H1 and H2 are ratios involving similar units and hence are pure numbers. H3 is typically in terms of milliseconds per job and H4 is expressed in terms of sectors per job. Sectors are units of hard disk storage; each sector typically has 512 bytes. Most I/O job requests to hard disks involve data, the size of which is a multiple of the sector size of the disk. Data relating to each of the variables H1 to H4 is collected by the operating system kernel in the form of histograms.

Database operations involve a high number of reads relative to the number of writes. Database and file system designs generally ensure spatial locality of database files. Accordingly, seek distances for accessing data in databases are typically relatively short. In such a scenario, H2 is very high due to the disproportionate number of read operations, perhaps in the order of 0.7. H4 is relatively low, in the order of 512 sectors. H1 and H3 have mid-range values, with actual values depending on the specific case at hand.

Figure 5A:
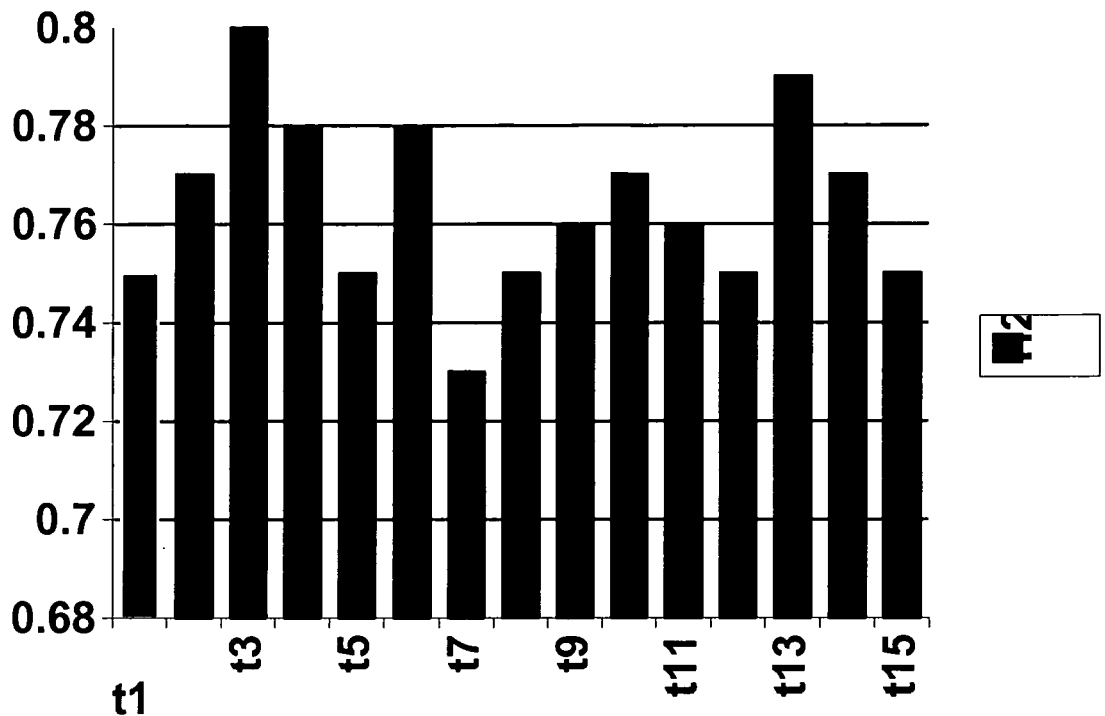
FIG. 5a is a plot of a first heuristic when performing database operations.
Figure 5B:
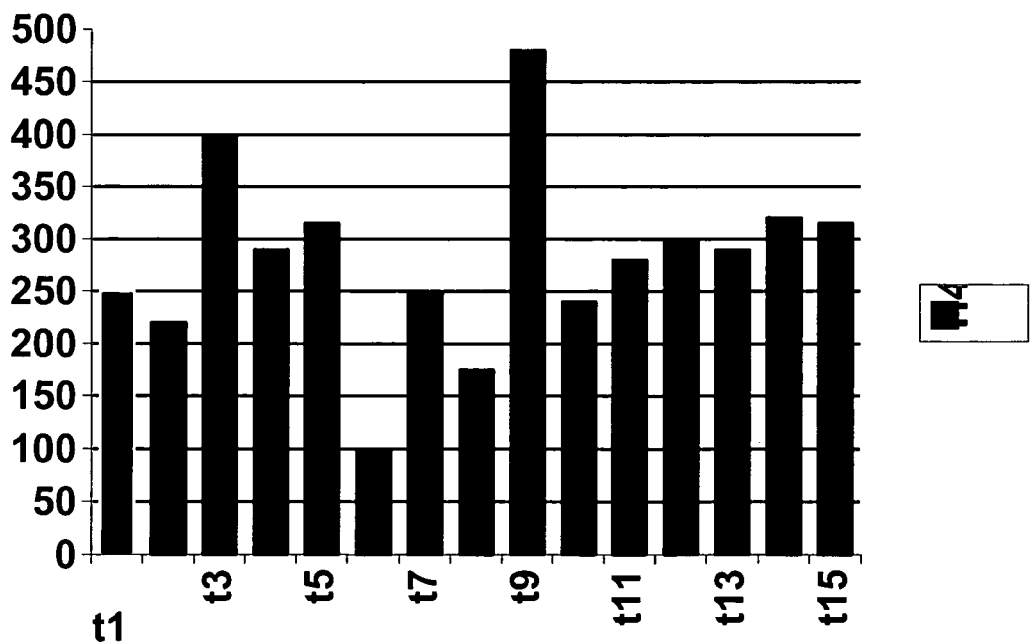
FIG. 5b is a plot of a second heuristic when performing database operations.

FIG. 5a shows an exemplary plot of the value of H2 during such database operations. The value of H2 fluctuates from time t1 to time t15 between the value range of 0.68 and 0.8, indicating that there is a high proportion of read operations. FIG. 5b shows an exemplary plot of the value of H4 during the same time period as shown in FIG. 5a. The value of H4 fluctuates between the value range of 100 and approximately 480 sectors.

During compilation of the Linux kernel, there are a few processes performing extremely disk intensive operations requiring a large number of read and write job requests to be submitted to the I/O scheduler. The number of read requests is approximately equal to the number of write requests. Accordingly, H1 is relatively high, with a ratio of approximately 4 or more. H2 is close to 0.5, and H3 and H4 are case dependent.

Figure 6A:
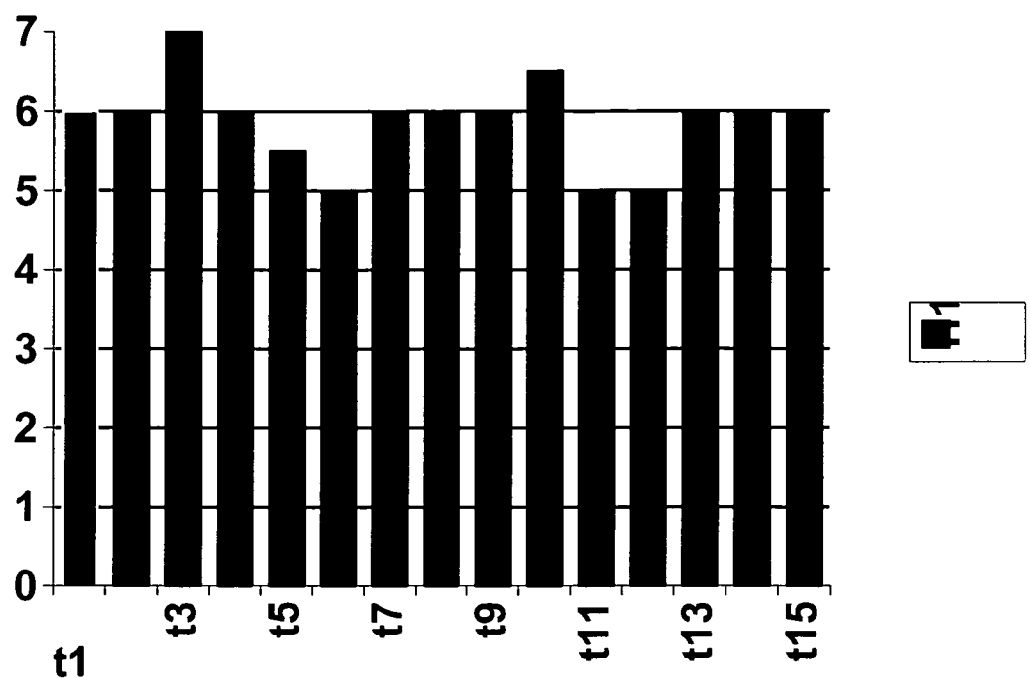
FIG. 6a is a plot of a first heuristic when performing a compilation.
Figure 6B:
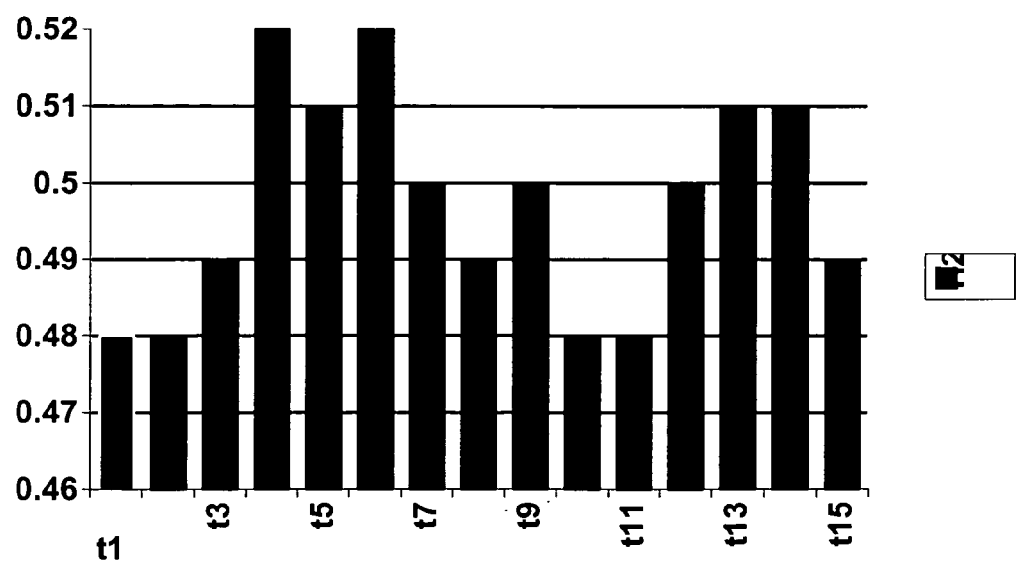
FIG. 6b is a plot of a second heuristic when performing a compilation.

FIG. 6a shows an exemplary plot of the values of H1 during such a compilation from time t1 to time t15. The value of H1 fluctuates between 5 and 7 in this example. FIG. 6b shows an exemplary plot of the values of H2 during the same time interval t1 to t15 shown in FIG. 6a. The value of H2 fluctuates between 0.48 and 0.52 in this example.

File downloads are highly disk intensive and involve a large number of writes to disk. Clever design of download mechanisms ensures that these write jobs are submitted in parallel to provide low processing times. Therefore, in this case, H1 is high (>4), H2 (<0.2) and H4 are low (<512 sectors), and H3 is low.

Figure 7A:
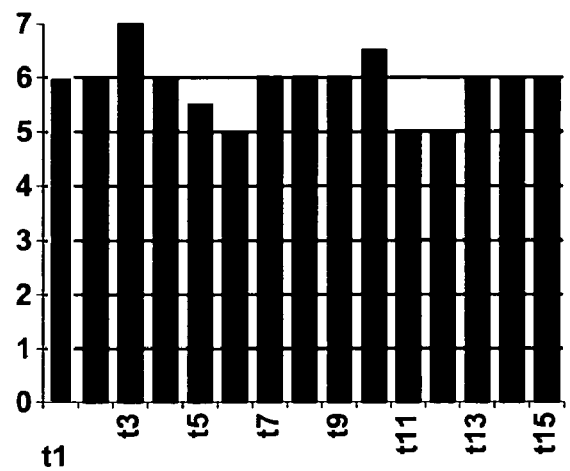
FIG. 7a is a plot of a first heuristic when performing a file download.
Figure 7B:
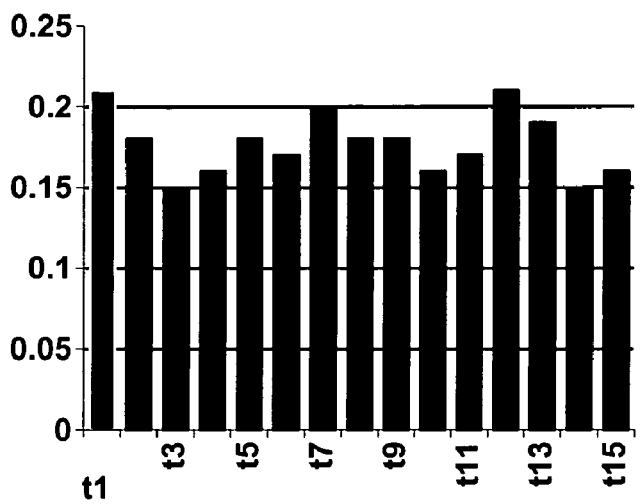
FIG. 7b is a plot of a second heuristic when performing a file-download.
Figure 7C:
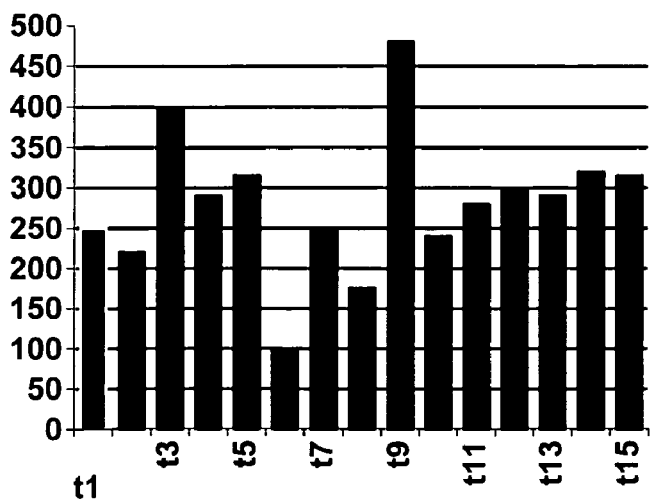
FIG. 7c is a plot of a third heuristic when performing a file download.

FIG. 7a shows an exemplary plot of the values of H1 during a time interval t1 to t15. The value of H1 varies between 5 and 7. FIG. 7b shows an exemplary plot of the values of H2 during the same time interval t1 to t15 shown in FIG. 7a. The value of H2 varies between 0.15 and 0.21. FIG. 7c is a corresponding exemplary plot of the values of H4 during the same time interval t1 to t15 shown in each of FIGS. 7a and 7b. The value of H4 varies between 100 and 480 sectors, with the majority of values in the 200 to 300 sector range. Only two values are below 200 and only one value is above 400.

In accordance with an embodiment of the invention, an operating system kernel is provided that determines which available I/O scheduler is to be used for a given workload. In this example, the available schedulers are a FIFO scheduler, an anticipatory scheduler, a Fairness Queue algorithm scheduler, and a default, modified FIFO scheduler.

Table 1 shows the criteria applied by the operating system kernel in this example to determine which scheduler to use. The character "x" represents a "Don't Care" state. If H2>0.7 and H4<512 sectors, the kernel switches to the anticipatory scheduler. If H1>4 and H2>0.4 and <0.6, the kernel switches to the Fairness Queue scheduler. If H1>4 and H2<0.2 and H4<512 sectors, the kernel switches to the FIFO scheduler. If none of the above heuristics are met, the kernel switches to the default scheduler.

TABLE 1

| H1 | H2 | H3 | H4 | Scheduler to be Used |
|---|---|---|---|---|
| x | >0.7 | x | <512 sectors | Anticipatory Scheduler |
| >4 | >0.4 and <0.6 | x | x | Fairness Queue Algorithm |
| >4 | <0.2 | x | <512 sectors | FIFO Scheduler |
| x | x | x | x | Default Scheduler |

The figures in Table 1 are representative of a particular example. Under practical circumstances, these figures and, indeed, the parameters may be different.

The embodiments of the present invention exploit the fact that the conditions under which each of these schedulers provides best results are mutually exclusive. The autonomic selection of I/O scheduler seeks to improve the performance of the computing system under each of the schedulers selected. The actual gains realised by switching schedulers depends on the schedulers available and the nature of the workqueue.

An anticipatory scheduler operating on the file download workload introduces a large amount of latency. Although I/O job requests are being submitted asynchronously, the scheduler waits for further requests instead of proceeding with the scheduling of currently available job requests. If the write job requests are distributed among a few processes to accelerate an operation, the average seek distance H4 is not necessarily small. However, anticipatory scheduler performs better when H4 is relatively small.

In the case in which there are asynchronous read job requests, the Fairness Queue algorithm scheduler leads to stalled reads. Synchronous reads result in a value of H2 close to 1.0, whereas the Fairness Queue algorithm scheduler performs better when there are an equal number of read and write job requests.

A computing system with an autonomic I/O scheduler selector is capable of handling any type of workload. An implementation with a number of schedulers quickly adjusts to a new workload to provide optimal throughput and minimal latency. Each scheduler, irrespective of the algorithm employed, maintains an amount of heuristics for tracking and fine-tuning purposes. In accordance with an embodiment of the present invention, the heuristics are maintained independently of the schedulers. If the addition of the heuristic monitoring and maintenance to the kernel results in a few hundred additional instructions, those instructions consume a few microseconds of additional computation on a modern computing system. The largest time delay in disk I/O occurs due to disk seeks in which a disk head moves from one location to another location corresponding to a new job. The delay results from physical limitations of the disk drives and is measured in milliseconds. The right selection of scheduler greatly reduces the disk seek times for any given workload and the additional increase in throughput far outweigh the incidental overhead of monitoring and maintaining the heuristics.

Latencies introduced due to an incorrect selection of scheduling algorithm are also measured in milliseconds. In a typical implementation of an anticipatory scheduler, the scheduler waits for approximately 50 milliseconds after every job. In cases in which the waiting is unnecessary and there is no successive job from the same process, the waiting time is a waste. In a particular operation involving hundreds of I/O job requests, the waiting times are measured in seconds or, in extreme cases, minutes. Switching to a more appropriate scheduling algorithm for such an operation saves seconds. Again, the monitoring and maintenance of heuristics is relatively small compared to potential time savings.

The autonomic scheduler selector can be used to apply a computing system to any workload and produces improved performance by increasing disk throughput and reducing latency.

Computer Platform

Figure 8:
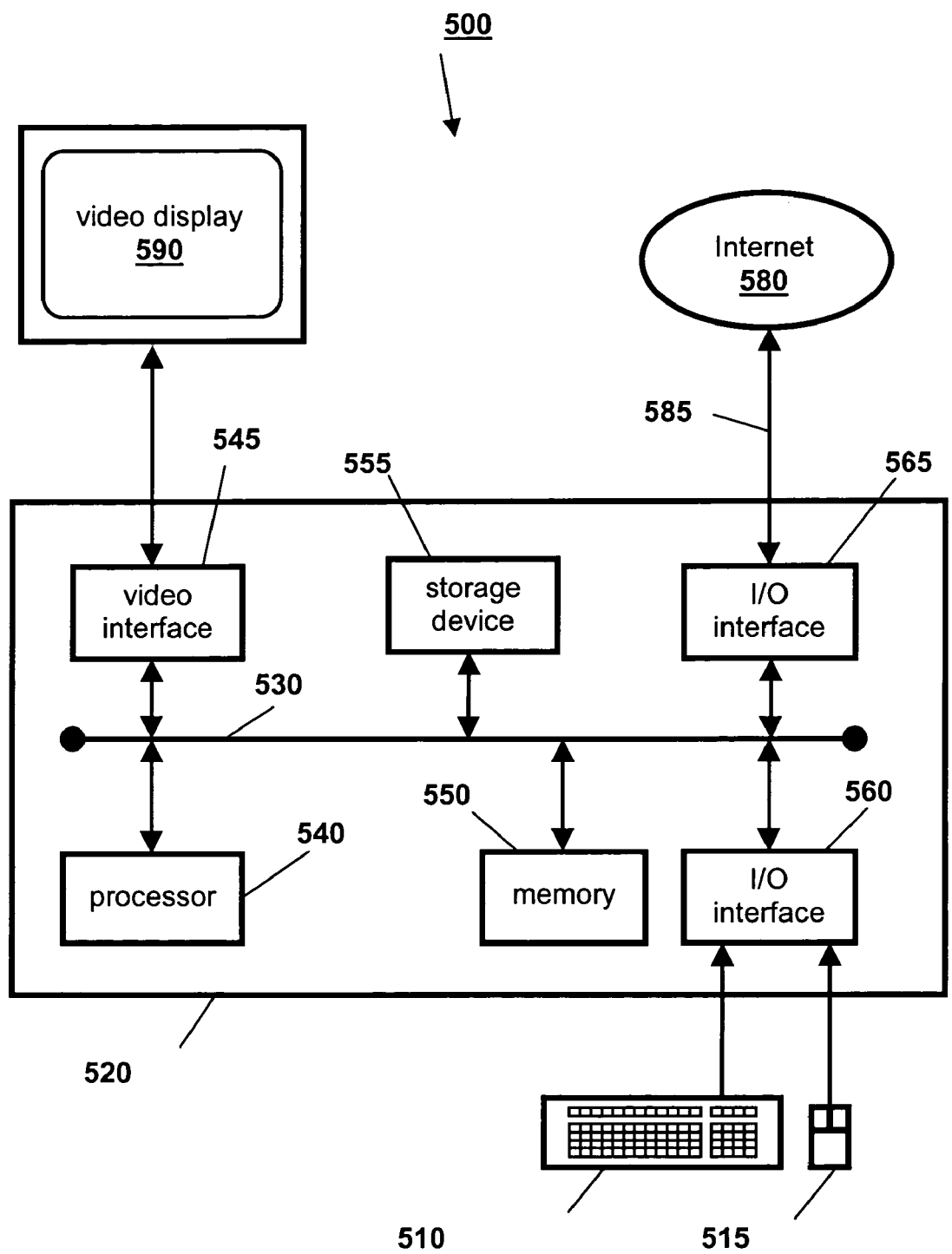
FIG. 8 is a schematic representation of a computer system suitable for performing the techniques described with reference to FIGS. 1 to 7c.

FIG. 8 is a schematic representation of a computer system 500 that can be used to implement the techniques described herein. Computer software executes under a suitable operating system installed on the computer system 500 to assist in performing the described techniques. This computer software is programmed using any suitable computer programming language, and may be thought of as comprising various software code means for achieving particular steps.

The components of the computer system 500 include a computer 520, a keyboard 510 and mouse 515, and a video display 590. The computer 520 includes a processor 540, a memory 550, input/output (I/O) interfaces 560, 565, a video interface 545, and a storage device 555.

The processor 540 is a central processing unit (CPU) that executes the operating system and the computer software executing under the operating system. The memory 550 includes random access memory (RAM) and read-only memory (ROM), and is used under direction of the processor 540.

The video interface 545 is connected to video display 590 and provides video signals for display on the video display 590. User input to operate the computer 520 is provided from the keyboard 510 and mouse 515. The storage device 555 can include a disk drive or any other suitable storage medium.

Each of the components of the computer 520 is connected to an internal bus 530 that includes data, address, and control buses, to allow components of the computer 520 to communicate with each other via the bus 530.

The computer system 500 can be connected to one or more other similar computers via a input/output (I/O) interface 565 using a communication channel 585 to a network, represented as the Internet 580.

The computer software may be recorded on a portable storage medium, in which case, the computer software program is accessed by the computer system 500 from the storage device 555. Alternatively, the computer software can be accessed directly from the Internet 580 by the computer 520. In either case, a user can interact with the computer system 500 using the keyboard 510 and mouse 515 to operate the programmed computer software executing on the computer 520.

Other configurations or types of computer systems can be equally well used to implement the described techniques. The computer system 500 described above is described only as an example of a particular type of system suitable for implementing the described techniques.

CONCLUSION

The detailed description provides a small number of embodiments, which are not intended to limit the scope, applicability, or configuration of the invention. Rather, the detailed description of the embodiments provides those skilled in the art with enabling descriptions for implementing embodiments of the invention. It should be understood that various changes may be made in the function and arrangement of elements without departing from the spirit and scope of the invention as set forth in the appended claims.

I claim:

1. A method for selecting an input/output scheduler in a computing system having a plurality of input/output schedulers, said method comprising the steps of:
   a) mapping, by an operating system kernel, said plurality of operating system input/output schedulers against respective sets of heuristics, wherein such a set of heuristic includes heuristic variables for characterizing performance states of the computing system, the variables including:
      a first variable for a number of input/output job requests as a proportion of a total number of processes requesting input/output jobs;
      a second variable for a number of read operations as a proportion of total number of read and write operations; and
      a third variable for an average disk seek distance of submitted job requests; and
   wherein the heuristic sets include:
   a first one of the heuristic sets defining a first performance state of the computing system, wherein a certain predefined high proportion of read operations is exceeded for the second variable and a certain predefined average seek distance is not exceeded for the third variable;
   a second one of the heuristic sets defining a second performance state of the computing system, wherein a certain predefined high level of input/output job requests per process is exceeded for the first variable, a certain predefined low proportion of read operations is not exceeded for the second variable, and the certain predefined average seek distance is not exceeded for the third variable; and a third one of the heuristic sets defining a third performance state of the computing system, wherein the certain predefined high level of input/output job requests per process is exceeded for the first variable and the certain predefined low proportion of read operations is exceeded but the certain predefined high proportion of read operations is not exceeded for the second variable;

wherein the operating system input/output schedulers include first, second and third input/output schedulers, and the mapping includes the operating system kernel:

associating the first one of the heuristic sets with the first scheduler, the second one of the heuristic sets with the second scheduler and the third one of the heuristic sets with the third scheduler; and wherein the method includes:

b) monitoring performance of said computing system, including a thread of the operating system kernel monitoring performance values of the heuristic variables;

c) selecting one of the input/output schedulers by the operating system kernel thread, wherein the selecting is responsive to the operating system kernel thread determining that a performance state of the computing system is such that values of said monitored heuristic variables match one of said first, second, or third sets of heuristics; and d) performing a number of input/output operations by the computer system to read to or write from hardware devices in an order determined by the selected one of the input/output schedulers, wherein the performing of the input/output operations in the order determined by the selected scheduler improves input/output performance of the computer system.

2. The method according to claim 1, wherein the operating system input/output schedulers include a fourth input/output scheduler and the method includes:

selecting the fourth input/output scheduler, wherein the selecting is responsive to the operating system kernel thread determining that a performance state of the computing system is such that values of said monitored heuristic variables do not match any of said first, second or third sets of heuristics.

3. The method according to claim 1, wherein the heuristic variables include average time for a process to submit successive job requests.

4. The method according to claim 1, including:

scheduling input/output operations responsive to an anticipatory scheduling algorithm by the first input/output scheduler;

scheduling input/output operations responsive to a first in first out algorithm by the second input/output scheduler; and scheduling input/output operations responsive to a fairness queue algorithm by the third input/output scheduler.

5. A computing system for selecting an input/output scheduler, said computing system comprising:

a processor;

tangible computer readable memory having instructions for the processor for at least one application and first, second, and third input/output schedulers, and having a mapping of said input/output schedulers against corresponding first, second, and third sets of operating heuristics; wherein such a heuristic sets includes first, second, and third heuristic variables:

the first variable being for a number of input/output job requests as a proportion of a total number of processes requesting input/output jobs;

the second variable being for a number of read operations as a proportion of total number of read and write operations, and the third variable being for an average disk seek distance of submitted job requests;

and wherein a first one of the heuristic sets defines a first performance state of the computing system, wherein a certain predefined high proportion of read operations is exceeded for the second variable and a certain predefined average seek distance is not exceeded for the third variable;

a second one of the heuristic sets defines a second performance state of the computing system, wherein a certain predefined high level of input/output job requests per process is exceeded for the first variable, a certain predefined low proportion of read operations is not exceeded for the second variable, and the certain predefined average seek distance is not exceeded for the third variable; and a third one of the heuristic sets defines a third performance state of the computing system, wherein the certain predefined high level of input/output job requests per process is exceeded for the first variable and the certain predefined low proportion of read operations is exceeded but the certain predefined high proportion of read operations is not exceeded for the second variables; and wherein the mapping includes associations among respective first, second and third ones of the heuristic sets and first, second and third ones of the input/output schedulers; and wherein the computing system further includes:

instructions for an operating system kernel for gathering and analysing heuristics relating to job requests submitted to said operating system kernel by said at least one application, said operating system kernel selecting one of said first, second, and third input/output schedulers responsive to the operating system kernel thread determining that a performance state of the computing system is such that values of said heuristic variables match one of said first, second or third sets of heuristics; and instructions for performing a number of input/output operations by the computer system to read to or write from hardware devices in an order determined by the selected one of the input/output schedulers, wherein the performing of the input/output operations in the order determined by the selected scheduler improves input/output performance of the computer system.

6. The computing system according to claim 5, wherein the heuirstic variables includes average time for a process to submit successive job requests.

7. The computing system according to claim 5, wherein the first input/output scheduler is operable to schedule input/output operations responsive to an anticipatory scheduling algorithm, the second input/output scheduler is operable to schedule input/output operations responsive to a first in first out algorithm and the third input/output scheduler is operable to schedule input/output operations responsive to a fairness queue algorithm.

8. A computer program product comprising a tangible computer readable medium having a computer program instructions fixedly recorded therein for selecting an input/output scheduler in a computing system having a plurality of input/output schedulers, said computer program comprising:

computer program instructions for mapping, by an operating system kernel, said plurality of input/output schedulers against respective sets of heuristics, wherein such a set of heuristics includes heuristic variables for characterizing performance states of the computing system, the variables including:

a first variable for a number of input/output job requests as a proportion of a total number of processes requesting input/output jobs;

a second variable for a number of read operations as a proportion of total number of read and write operations; and a third variable for an average disk seek distance of submitted job requests; and wherein the computer program instructions for mapping includes:

computer program instructions for a first one of the heuristic sets defining a first performance state of the computer system, wherein a certain predefined high proportion of read operations is exceeded for the second variable and a certain predefined average seek distance is not exceeded for the third variable;

computer program instructions for a second one of the heuristic sets defining a second performance state of the computer system, wherein a certain predefined high level of input/output job requests per process is exceeded for the first variable, a certain predefined low proportion of read operations is not exceeded for the second variable, and the certain predefined average seek distance is not exceeded for the third variable; and computer program instructions for a third one of the heuristic sets defining a third performance state of the computer system, wherein the certain predefined high level of input/input job requests per process is exceeded for the first variable and the certain predefined low proportion of read operations is exceeded but the certain predefined high proportion of read operations is not exceeded for the second variable; and wherein the computer program product includes:

computer program instructions for monitoring said computing system, wherein the computer program code means for monitoring includes computer program code means for a thread of the operating system kernel monitoring performance values of the heuristic variables;

computer program instructions for the operating system kernel thread selecting one of the input/output schedulers, wherein the selecting is responsive to the operating system kernel thread determining that a performance state of the computing system is such that values of said monitored heuristics variables match one of said first, second, or third sets of heuristics; and computer program instructions for performing a number of input/output operations by the computer system to read to or write from hardware devices in an order determined by the selected one of the input/output schedulers, wherein the performing of the input/output operations in the order determined by the selected scheduler improves input/output performance of the computer system.

9. The computer program product of claim 8, comprising:

computer program instructions for the first input/output scheduler scheduling input/output operations responsive to an anticipatory scheduling algorithm;

computer program instructions for the second input/output scheduler scheduling input/output operations responsive to a first in first out algorithm; and computer program instructions for the third input/output scheduler scheduling input/output operations responsive to a fairness queue algorithm.

* * * * *